United States Patent [19]
Anderson

[11] Patent Number: 5,029,410
[45] Date of Patent: Jul. 9, 1991

[54] FISHING LURE

[76] Inventor: Donald L. Anderson, Rt. 3, Box 576, Delano, Minn. 55328

[21] Appl. No.: 567,634

[22] Filed: Aug. 15, 1990

[51] Int. Cl.$^5$ .............................................. A01K 91/00
[52] U.S. Cl. ................................... 43/44.95; 43/44.92; 43/43.49; 43/43.23; 43/42.36; 43/42.72
[58] Field of Search ................... 43/42.36, 42.7, 42.72, 43/42.23, 42.49, 44.87, 44.9, 44.91, 44.92, 44.95

[56] References Cited
U.S. PATENT DOCUMENTS

| | | | |
|---|---|---|---|
| 3,097,373 | 7/1963 | Wisti | 43/44.9 X |
| 4,798,021 | 1/1989 | Miklos | 43/43.13 X |
| 4,903,428 | 2/1990 | Sluiter et al. | 43/26.1 |

Primary Examiner—Kurt Rowan
Assistant Examiner—Patty E. Hong
Attorney, Agent, or Firm—Grady J. Frenchick

[57] ABSTRACT

A plug-type artificial fishing lure contains a mechamism within the body which operates as a leader dispensing and retrieving means. The mechanism is disposed in a cavity of the body, and includes a rotatable axle with a spool mounted thereon. The axle includes a ratchet means, and a trigger means releasably engages the ratchet thereby controlling rotation of the axle. The leader is dispensed by unwinding from the spool, and retrieved by rotating the axle and spool by a wind-up means, such as a spring, in a direction opposite the dispensing direction.

9 Claims, 1 Drawing Sheet

U.S. Patent — July 9, 1991 — 5,029,410
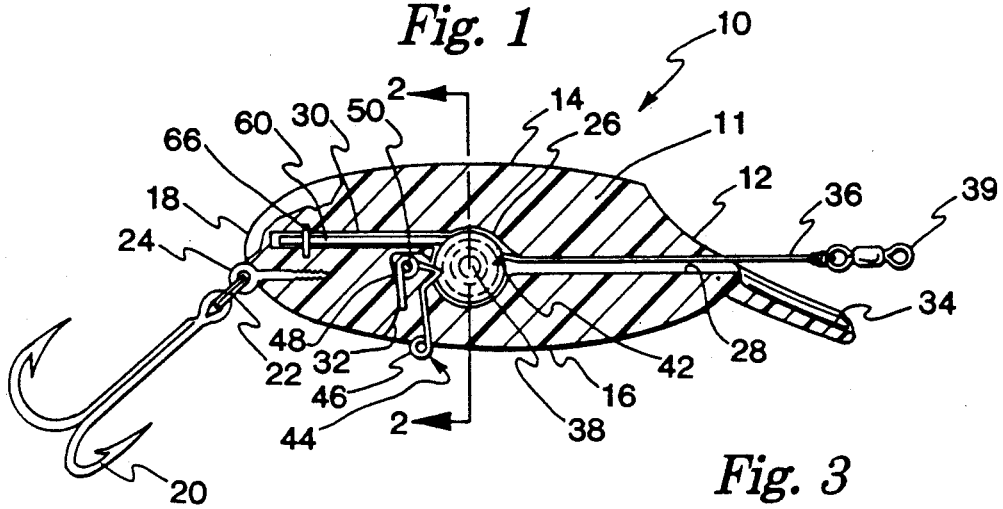
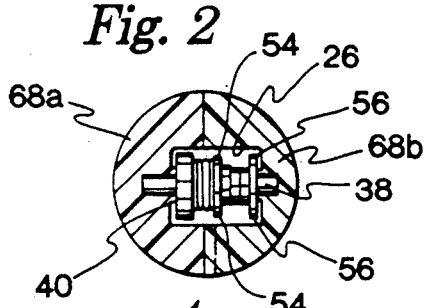
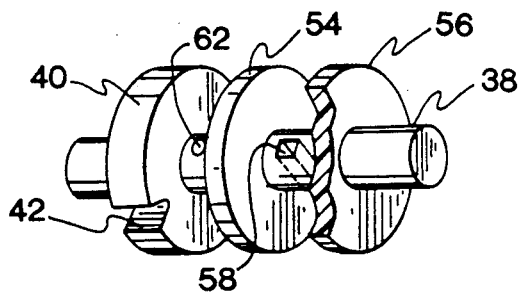
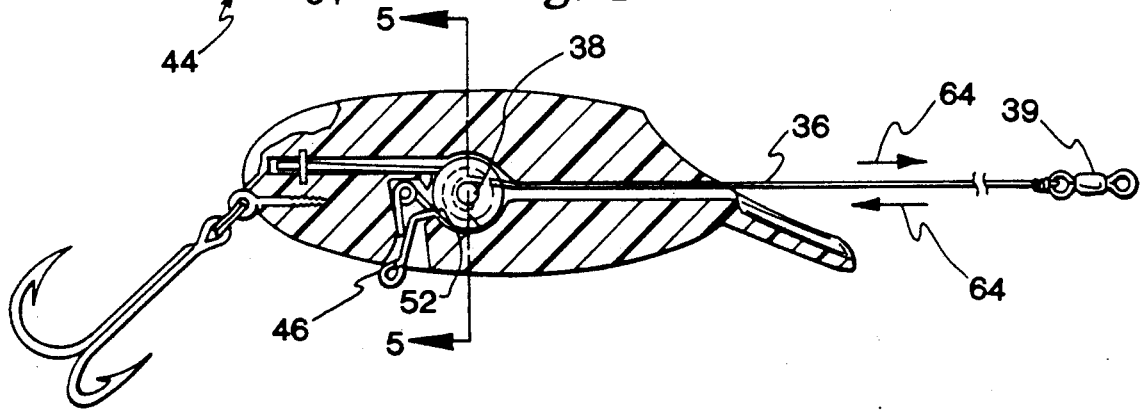
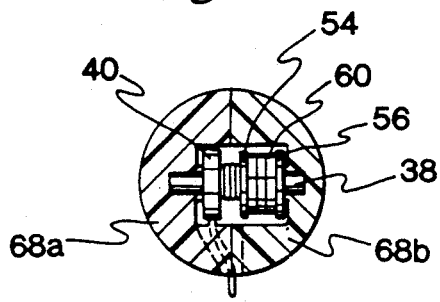

FISHING LURE

FIELD OF THE INVENTION

This invention relates to fishing lures. More particularly, this invention relates to plug-type artificial fishing lures. Yet even more particularly, this invention relates to plug-type fishing lures which are particularly easy to attach to and to detach from a fishing line.

DESCRIPTION OF THE PRIOR ART

U.S. Pat. No. 4,903,428 to Alexander V. Sluiter et al discloses a fishing jigger. The fishing jigger of Sluiter has a paddle wheel rotatably mounted in a cavity of the jigger body. The sluiter jigger is intended for jigging a separate lure.

U.S. Pat. No. 4,134,224 to Kenneth W. Clark discloses a spoon type or plug type artificial fishing lure with an angularly extending diving plate. The fishing line of the Clark device is attached directly to a hook, the lure body remaining free for movement along the fishing line relative to the hook.

U.S. Pat. No. 4,798,021 to Louis F. Miklos discloses an automatic horizontal jigging downrigger. The downrigger of Miklos, as with Sluiter et al. above, contemplates the utilization of essentially any appropriate lure.

U.S. Pat. No. 3,010,243 to John T. Dickinson discloses a convertible fishing lure. The Dickinson lure is convertible in the sense that a single hook and leader means is attached to a fishing line in conjunction with multiple lure bodies of various sizes, colors, and actions.

Patent Cooperation Treaty Application PCT/US 87/01519 in the name of Frank G. Pierce discloses a fishing lure having a line activated spring mechanism mounted within the body of the lure for driving a lure body component projecting from the lure. For example, tail fins, movable legs or wings are driven by the windup mechanism of Pierce.

None of the above references, alone or in combination, disclose or suggest the present invention.

BRIEF SUMMARY OF THE INVENTION

Briefly, in one aspect, the present invention is a plug-type artificial fishing lure which dispenses and retrieves leader therefrom. A lure of the present invention comprises an elongate plug body, the body having a cavity within or therein. The cavity, by means of a channel, communicates with the front of the plug body. The channel is the means by which the leader is wound/unwound from the cavity to the outside. The plug body has a front, a back, a top and a bottom, as well as, longitudinal and transverse axes. The front of the plug body generally is closest to the point where the lure is connected to the fishing line. The cavity contains therein a leader dispensing and retrieving means. The leader dispensing and retrieving means includes a transversely mounted, rotatable axle, the axle having mounted thereon spool means from which leader can be wound and unwound. The axle also includes a ratchet means disposed thereabout. The ratchet means controls rotation of the axle. In a preferred embodiment, the ratchet means is a wheel having a multiplicity of teeth disposed about the perimeter thereof.

The leader dispensing and retrieving means also includes a wind-up mechanism means or retrieval means which retrieves or winds the leader into the lure cavity and onto the spool means, when permitted to do so, by rotating the axle in the direction opposite the dispensing or play out direction.

The plug cavity also has mounted adjacent thereto trigger means which releasably engages the teeth of the ratchet means to prevent leader from being unwound from said spool means, and upon release, to permit said leader to be dispensed or wound around said spool means. The trigger means communicates with the cavity and, by means of its own cavity, extends through the lure, to the exterior of said body thereby permitting activation or deactivation of the retrieval dispenser mechanism by hand, preferably from the bottom thereof.

In a preferred aspect of the present invention, the plug body is comprised of two cooperating sections which can be separated. When the sections are separated, the interior leader dispensing retrieving means is exposed. Exposure of the interior mechanism permits a preferred practice of the invention wherein the leader spool is detachable from the axis and can be replaced with a new spool of leader or more leader can be wound therearound.

BRIEF DESCRIPTION OF THE DRAWINGS

FIG. 1 is a right side elevational view of the present invention with parts cut away;

FIG. 2 is a section thereof taken along line 2—2 in FIG. 1;

FIG. 3 is a pictorial view thereof showing the compound spool structure;

FIG. 4 is a view similar to that of FIG. 1 thereof showing mechanical function of dispenser and retractor; and FIG. 5 is a section thereof taken along line 5—5 in FIG. 4.

DETAILED DESCRIPTION OF THE INVENTION

Reference is now made to the attached figures wherein like numerals are used to refer to like features of the invention depicted in the various views. There is shown in FIG. 1, a plug-type artificial fishing lure 10 having an elongate plug body 11. The exact shape of plug body 11 is not critical and is determined by the type of fishing lure which is to be marketed. Fishing lure 10 generally has a front 12, a top 14, a bottom 16, and a rear or back 18. Lure 10, therefore, has a longitudinal axis generally extending from the front 12 to the rear 18 and a transverse axis generally perpendicular to the section shown in FIG. 1. Plug 10 also has attached thereto fishhook 20. Fishhook 20 being attached by means of a ring 22 to an eyelet screw 24. Eyelet screw 24 is generally screwed into plug body 11, usually toward its rear 18. The precise location of hook 20 on plug body 11 is generally one of personal preference. Obviously, many hooks could be placed in plug body 11. However, placement of hooks on plug body 11 should be so as not to interfere with the operation of the mechanism described herein. Hook placement also should be made in view of the desire to catch fish.

Within plug 11 is a cavity 26. Cavity 26 is in communication with a forward channel 28, a rearward channel 30 and a bottom channel 22. Forward channel 28 and bottom channel 32 connect cavity 26 to the exterior of lure 10. Rearward channel 30, as will become apparent later, is optional, but needed for the present described embodiment of this invention. As shown, lure 10 has a lip 34 which is one of many possible mechanisms which could be attached to plug body 11 to impart a life-like action and appearance to lure 10 as it is pulled through water. Extending from channel 28 is a length of leader material 36 which is tied to a swivel 39. Within cavity 26 there is a tranversely mounted axle 38. Fixedly mounted on axle 38 is a rachet means comprising a wheel 40 with a plurality of notches or detents 42 disposed around the perimeter thereof. Also shown adjacent cavity 26 is a trigger means 44 which comprises a lever or trigger 46 which is biased toward notches 42 by means of torsion spring 48. Torsion spring 48 is mounted adjacent cavity 26 by means of transverse spring post 50. Lever or trigger 46, by means of its point 52 cooperates with notches 42 on wheel 40 to permit or restrict rotational motion about axle 38. Thus, manual movement of trigger 44 toward the rear 18 of lure 10 would release wheel 40 and permit rotation about axle 38.

Referring to FIGS. 2 and 3, also located on axle 38 is inner flange 54 and outer flange 56. Between outer flange 56 and inner flange 54 is an anchor hole 58 to which there would be attached in this embodiment, a rubber band 60. Between inner flange 54 and wheel 40 there is a leader anchor hole 62. Rubber band 60 would be attached to axle 38 by means of anchor hold 58. Similarly, leader 36 would be attached to axle 38 by means of leader anchor hold 62. Wheel 40 and inner flange 54 with the segment of axle therebetween define a spool on which leader 36 can be wound or unwound. Similarly, inner flange 54 and outer flange 56 with the intervening segment of axle 38 define a spool on which rubber band 60 may be wound. Thus, as leader 36 is unwound from axle 38, rubber band 60 is wound therearound. In this manner, rubber band 60 provides biasing force to retrieve leader 36 at such point as retrieval is desired. Obviously, there are other possible means by which a retrieval force or bias, e.g., a spring, may be imparted to axle 38.

Referring to FIG. 4, trigger means 44 has been manually moved toward the rear 18 of plug 10. Lever point 52 has been removed from notch 42 to permit rotation about axle 38. In this manner, leader 36 may be wound or unwound about the spool defined by wheel 40, axle 38 and inner flange 54. Arrows 64 indicate directions in which leader 36 may be dispensed or retrieved. FIG. 5 depicts, in partial section, the appearance of axle 38 when leader 36 has been substantially withdrawn from cavity 26 and rubber band 60 has been substantially wound upon the spool defined by inner flange 54, axle 38 and outer flange 56. As rubber band 60 is wound around axle 38, it is held in place within rearward channel 30 by staple 66.

As shown in FIGS. 2 and 5, lure body 11 can be composed of lure body segments or hemispheres 68a and 68b. These two hemispheres may be held together by any number of means, for example, screws, snaps or clips. In this embodiment of the invention, the screws would be removed and the two segments 68a and 68b would be separated. Cavity 26 then would be accessible. The compound spool depicted in FIG. 3 could be removed and substituted with a second spool having a different leader material. This is a preferred practice of the present invention which permits multiple types of leader material to be used with a lure of the present invention.

The present invention is intended for use with fish line such as that which would be dispensed from a fishing pole. In a conventional practice, a relatively lightweight fish line is dispensed from a reel, e.g., by casting with a fish pole. The fish line then, in turn, is attached to a segment of much stronger leader material which is, in turn, attached to some portion of a fishing lure. The use of a stronger leader permits much lighter fishing line to be used for most of the connection to the lure without the increased risk of having the line severed, e.g., by a fish biting it. In conventional practice, leader material can include flexible wire, presuming some mechanism is provided, e.g., a swivel, which permits the lure to rotate with respect to the leader material. Alternatively, a length of heavyweight polymeric material may be used to connect the fish line to the lure.

In the above conventional practice, it is necessary for multiple knots to be tied either on the end of the fish line or on a swivel/hook which is, in turn, attached to a portion of a fishing lure. Fishing lures are generally provided with a hook or an eyelet to which the leader is attached. The leader can be connected directly to the lure eyelet or an intermediate connector, e.g., a swivel/hook arrangement, can be employed. This invention is intended to be used with either method of lure attachment. If a relatively short piece of leader material is intended, it is sometimes difficult to tie knots on both ends (i.e., the fishing line end and the lure end) and still have sufficient leader material or line remaining. This invention is intended to address this difficulty.

The manner in which this difficulty is addressed, in the present invention, is the use of the interiorly disposed leader dispensing/retrieving means described above. In the lure cavity, there is a reel or spool of leader material which, via the channel, is dispensed from the front of the lure. Trigger means 44 is employed to release the ratchet means. A substantial excess of leader material may be withdrawn or played out from the front of the lure in order to connect the leader to the fish line, e.g., by tying it. The extra length of leader material provided in this practice of the invention permits fisherpersons with large hands or fingers to tie the required knots through the use of ample lengths of leader material.

After the leader material or line has been tied to the fish line in one of the manners preferred by the fisherperson, trigger means 44 then is employed in conjunction with the retrieval means to retrieve any extra length of leader material. Leader material which is not intended to be outside lure body 11 is wound onto the leader spool defined above. Thus, a precisely determinable and controllable length of leader material has been deployed. Note that with different fishing techniques, different lengths of leader may be employed in a practice of the invention.

There are, of course, various different, but equivalent dispensing and retrieving means which could be employed in the present invention. For example, a spring could be employed to provide the return bias necessary to retrieve leader material 36. Such a spring could be wrapped around axle 36 so as to be stretched during rotation. Alternatively, a spring could be disposed transversely around axle 36 to be wound or unwound as axle 36 is rotated in one direction or another.

Various modifications and permutations of the present invention will become immediately obvious to one of ordinary skill in this art having read the above disclosure. Those embodiments and permutations are to be included within the scope of the attached claims.

What is claimed is:

1. A plug-type artificial fishing lure which dispenses and retrieves leader therefrom comprising:
   an elongate plug body having a transverse and longitudinal axis, a top, a bottom, a front and a back, said body having therein;
   a cavity, the cavity communicating with the front of said lure by means;
   of a channel;
   the cavity further contains therein:
   leader dispensing and retrieving means comprising:
   a transversely mounted, rotatable axle, the axle having mounted thereon spool means from which leader can be wound and unwound; and
   ratchet means, the ratchet means for controlling rotation of the axle, the leader dispensing and retrieving means further includes:
   wind-up means for retrieving said leader but which also permits said leader to be dispensed when released;
   the cavity having mounted adjacent thereto:
   trigger means which releasably engages said ratchet means to prevent leader from being unwound from said spool means and which upon release, permits said leader to be dispensed or rewound from said spool means, the trigger means extending from adjacent said cavity within said plug to the exterior of said plug body whereby it can manually be operated.

2. A lure in accordance with claim 1 wherein the plug body is comprised of two cooperating sections.

3. A lure according to claim 2 wherein the spool means is detachably engaged to said axis.

4. A lure according to claim 1 wherein a plurality of hooks are disposed upon the plug body.

5. A lure according to claim 1 wherein the retrieval means is a spring.

6. A lure according to claim 1 wherein the retrieval means is an elastic band.

7. A plug-type artificial fishing lure which dispenses and retrieves leader therefrom and has a longitudinal and a transverse axis and a front and rear comprising:
   an elongate plug body, said body having therein:
   a cavity, the cavity communicating with said plug by means of a channel, the cavity containing therein:
   a leader dispensing and retrieving means comprising:
   a transversely mounted, rotatable axle, the axle having mounted thereon spool means from which a leader can be wound and unwound; and a ratchet means, the ratchet means controlling rotation of the axle and comprising a multiplicity of teeth disposed around the perimeter thereof;
   the leader dispensing and retrieving means including wind-up means which retrieves said leader when released;
   the cavity having mounted adjacent thereto;
   trigger means, said trigger means releasably engaging the teeth of said ratchet means to prevent leader from being unwound from said spool means and upon release from said teeth permitting said leader to be dispensed from said spool means; the trigger means extending from adjacent said cavity to the exterior of said plug body so as to permit it to be manually-operated.

8. A lure according to claim 7 wherein the plug body has disposed thereon a plurality of hooks.

9. A fishing lure according to claim 8 wherein the ratchet means comprises a wheel having teeth disposed about the perimeter thereof.

* * * * *